United States Patent
Berggren

(10) Patent No.: US 7,581,905 B2
(45) Date of Patent: Sep. 1, 2009

(54) VESSEL FOR STORING PARTICULATE MATTER AND DISCHARGE DEVICE FOR USE IN THE SAME

(75) Inventor: Wouter Detlof Berggren, Amsterdam (NL)

(73) Assignee: Shell Oil Company, Houston, TX (US)

( * ) Notice: Subject to any disclaimer, the term of this patent is extended or adjusted under 35 U.S.C. 154(b) by 330 days.

(21) Appl. No.: 10/531,567

(22) PCT Filed: Oct. 16, 2003

(86) PCT No.: PCT/EP03/50722

§ 371 (c)(1), (2), (4) Date: Apr. 14, 2005

(87) PCT Pub. No.: WO2004/035435

PCT Pub. Date: Apr. 29, 2004

(65) Prior Publication Data

US 2006/0013660 A1  Jan. 19, 2006

(30) Foreign Application Priority Data

Oct. 16, 2002  (EP) ................................. 02079300

(51) Int. Cl.
 *B65G 53/38* (2006.01)
(52) U.S. Cl. .......................................... 406/91; 406/90
(58) Field of Classification Search ................. 406/90, 406/91; 222/195
 See application file for complete search history.

(56) References Cited

U.S. PATENT DOCUMENTS

| | | | | |
|---|---|---|---|---|
| 1,971,852 A | * | 8/1934 | Goebels | 366/107 |
| 3,115,369 A | * | 12/1963 | Bozich | 406/14 |
| 3,254,766 A | * | 6/1966 | Anderson | 209/245 |
| 3,669,317 A | * | 6/1972 | Ivchenko et al. | 222/195 |
| 4,045,005 A | * | 8/1977 | Davis et al. | 366/101 |
| 4,067,623 A | * | 1/1978 | Klein et al. | 406/124 |
| 4,089,563 A | * | 5/1978 | Neu | 406/125 |
| 4,413,758 A | | 11/1983 | Walters | 222/195 |
| 4,848,975 A | * | 7/1989 | Alack | 406/138 |
| 4,934,876 A | * | 6/1990 | Dirkse et al. | 406/124 |
| 4,941,779 A | | 7/1990 | Dewitz et al. | 406/138 |
| 5,096,096 A | * | 3/1992 | Calaunan | 222/195 |
| 5,129,766 A | | 7/1992 | Dirkse et al. | 406/136 |

FOREIGN PATENT DOCUMENTS

BE  881 146  7/1980
GB  1025308  4/1966

OTHER PUBLICATIONS

International Search Report dated Feb. 3, 2004.

* cited by examiner

*Primary Examiner*—Douglas A Hess

(57) ABSTRACT

The invention pertains to a vessel (1) for storing particulate matter, such as pulverised coal or fly ash, comprising a main part (2) and, at its bottom portion, at least one discharge device (3), which comprises a converging outer shell (10) and a permeable, converging inner shell (14) positioned in the outer shell (10), the discharge device (3) being connected to the main part (2) by means of a first flange (9) at or near the lower rim of the bottom portion of the main port (2) and a second flange (11) at or near the upper rim of the outer shell (10). The inner shell (14) is secured to the inner wall of the outer shell (10) of the discharge device (3), preferably to the inner wall of the second flange (11). Thus, the number of gaskets is reduced and/or the positioning of the inner shell becomes less critical.

10 Claims, 3 Drawing Sheets

VESSEL FOR STORING PARTICULATE MATTER AND DISCHARGE DEVICE FOR USE IN THE SAME

The present application claims priority of International Application No. PCT/EP2003/050722 filed 16 Oct. 2003.

The invention pertains to a vessel for storing particulate matter, such as pulverised coal or fly ash.

Such vessels are employed inter alia for (temporary) storage of pulverised coal and fly ash in coal gasification plants. Coal gasification is known in the art and involves the partial combustion of carbonaceous materials such as coal and petroleum coke. The primary product is syngas, a mixture of carbon monoxide and hydrogen, which is often used to manufacture pure hydrogen and to synthesise ammonia, methanol, oxo chemicals and their derivatives, such as urea fertiliser and synthetic hydrocarbon fuels. Syngas can also be used directly as a fuel to generate heat, steam and electricity.

U.S. Pat. No. 5,129,766 (in the name of Shell Oil Company) discloses a vessel comprising a feed hopper (numeral 11 in FIG. 1) and a cone-shaped "receiving means 7". According to U.S. Pat. No. 5,129,766, it is of particular importance in the manufacture of synthesis gas that particulate fuel is introduced to burners within the gasifier in a uniform manner. Fluctuations in the mass flow rate of coal being supplied to the burners of the gasifier are detrimental to its performance.

Figure 2:
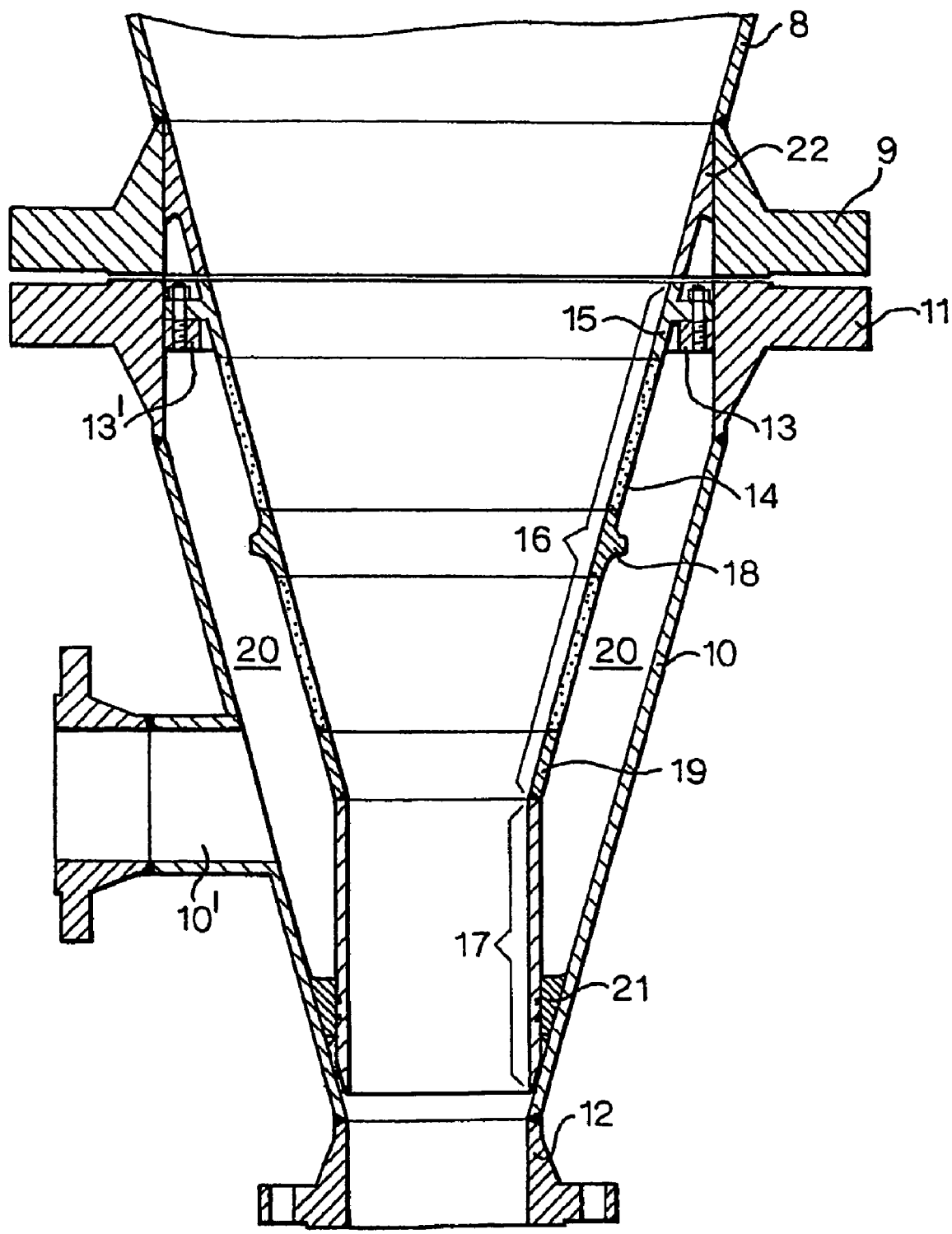

FIG. 2 of U.S. Pat. No. 5,129,766 shows a receiving means (7) which may be lined with a liner or inner shell (8) whose walls may be permeable, or porous, to gaseous fluids used for aerating the mixture of particulate solids and gas present in the receiving means. A jacket (13) surrounds the liner (8) and is mounted to form a substantially enclosed space between the walls (12) of the liner (8) and the jacket (13). As can be seen from FIG. 2, the receiving means (7) comprises a flange, which is connected, by means of bolts, to a flange on the bottom side of the feed hopper. The liner (8) is kept in place by clamping a flange forming the upper rim of the liner (8) between the said flanges on the receiving means (7) and the feed hopper (11).

As a result of this construction, extra leaks paths are created from the (pressurised) feed hopper to the atmosphere and small deviations in the position of the liner or the flanges may subject the liner to detrimental bending stresses, especially during bolt tightening. It is an object of the present invention to reduce at least one of these effects.

In accordance with the invention there is provided a vessel for storing particulate matter, such as pulverised coal or fly ash, comprising a main part and, at its bottom portion, at least one discharge device, which comprises a converging, preferably conical or substantially conical, outer shell and a permeable, converging inner shell positioned in the outer shell, the discharge device being connected to the main part by means of a first flange at or near the lower rim of the bottom portion of the main part and a second flange at or near the upper rim of the outer shell of the discharge device whereby the inner shell is secured, preferably at or near its upper rim, to the inner wall of the outer shell of the discharge device, preferably to the inner wall of the second flange. As a result, the number of gaskets between the flanges can be reduced, preferably to a single gasket, thus reducing or avoiding additional leak paths, and/or positioning of the inner shell becomes less critical, at least with regards to the tightening of the flanges.

In a preferred embodiment, the inner wall of the second flange is provided with at least one lug or a ring and the inner shell is attached to this lug or ring. Thus, there is no need for an individually designed flange adapted to accommodate the inner shell and one can use a standardised (ANSI, DIN, MSS, etc.) flange instead. Individually designed flanges have to be tailor made in a forging mill, requiring dedicated tools.

The invention also pertains to a vessel for storing particulate matter, wherein the outer shell comprises, at its bottom portion, a third flange and wherein the lower portion of the inner shell is cylindrical, preferably circle-cylindrical, and positioned in line with the central opening of the third flange and/or extends through this opening. Thus, the construction of the discharge device can be kept more straightforward. I.e., the cylindrical lower portion can be sealed by means of a relatively simple gasket, e.g. one or more non-metal O-rings, surrounding the lower portion. Further, a standard flange can be used as the third flange and free thermal expansion of the inner shell is facilitated.

Especially for vessels operating at higher temperatures, e.g. in excess of 200° C., it is preferred that a stuffing box assembly is positioned between the cylindrical lower portion of the inner shell and the outer shell. This type of sealing device will be discussed in more detail below.

The invention further pertains to a discharge device for use in a vessel for storing particulate matter, such as pulverised coal or fly ash, comprising a converging, preferably conical or substantially conical, outer shell and a permeable, converging inner shell positioned in the outer shell, characterised in that the inner shell has been attached to the inner wall of the outer shell. As set out above, it is preferred that the device comprises a flange forming the upper rim of the outer shell and that the inner shell is attached to the inner wall of this flange.

It is noted that U.S. Pat. No. 4,941,779 discloses "a vessel having downwardly converging walls at the lower end thereof forming a portion made of porous material having at least one apex for aerating the solid within the vessel so as to maintain a uniform mass flow rate of the solids and gas mixture discharged to a gasifier." As can be seen in schematic FIGS. 1 and 2, a jacket (13) surrounds the porous material. U.S. Pat. No. 4,941,779 does not mention or suggest the use of flanges nor does it mention or suggest the way in which the porous material has been fixed inside the jacket or hopper.

Although the invention is described hereinafter primarily with reference to pulverised coal, the vessels and discharge devices according to the invention are also suitable for other granular, pulverised, and/or powdered solids, such as resins, catalysts, fly ash, anthracite, brown coal, soot, petroleum coke, and the like.

Figure 1:
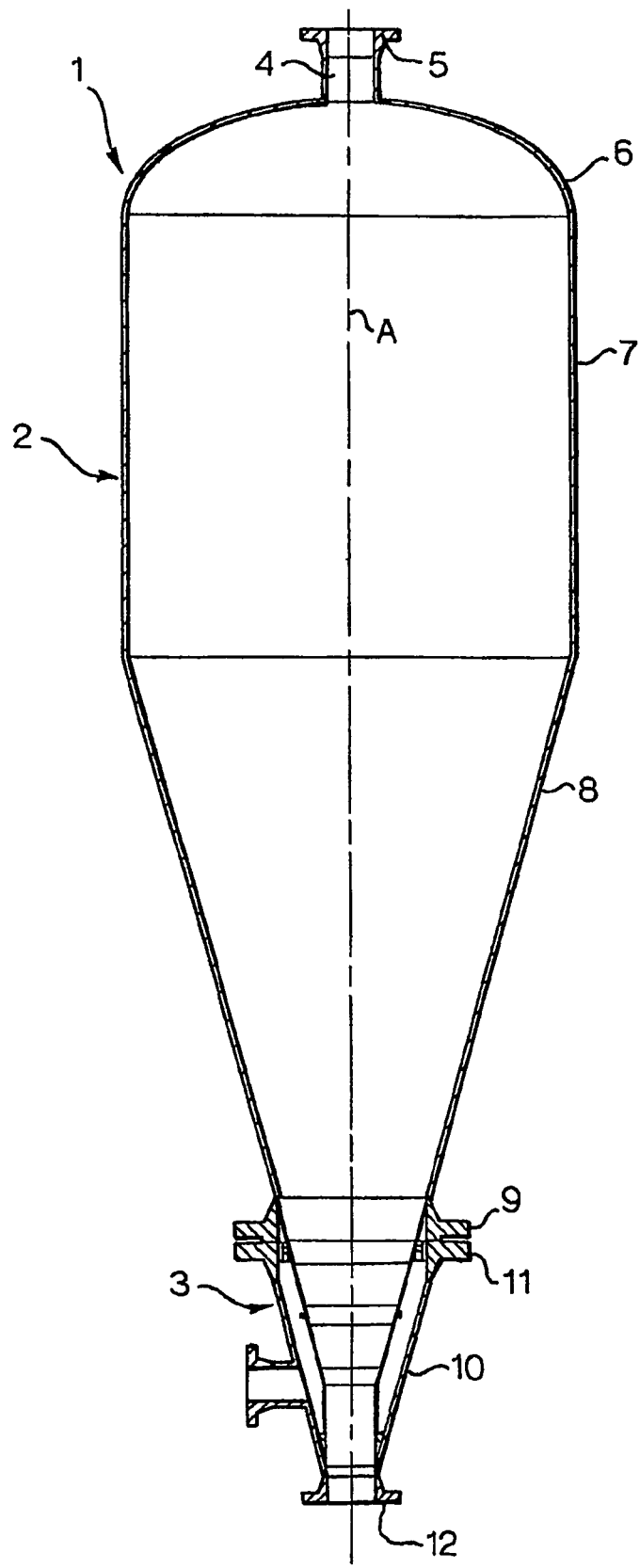
Figure 3:
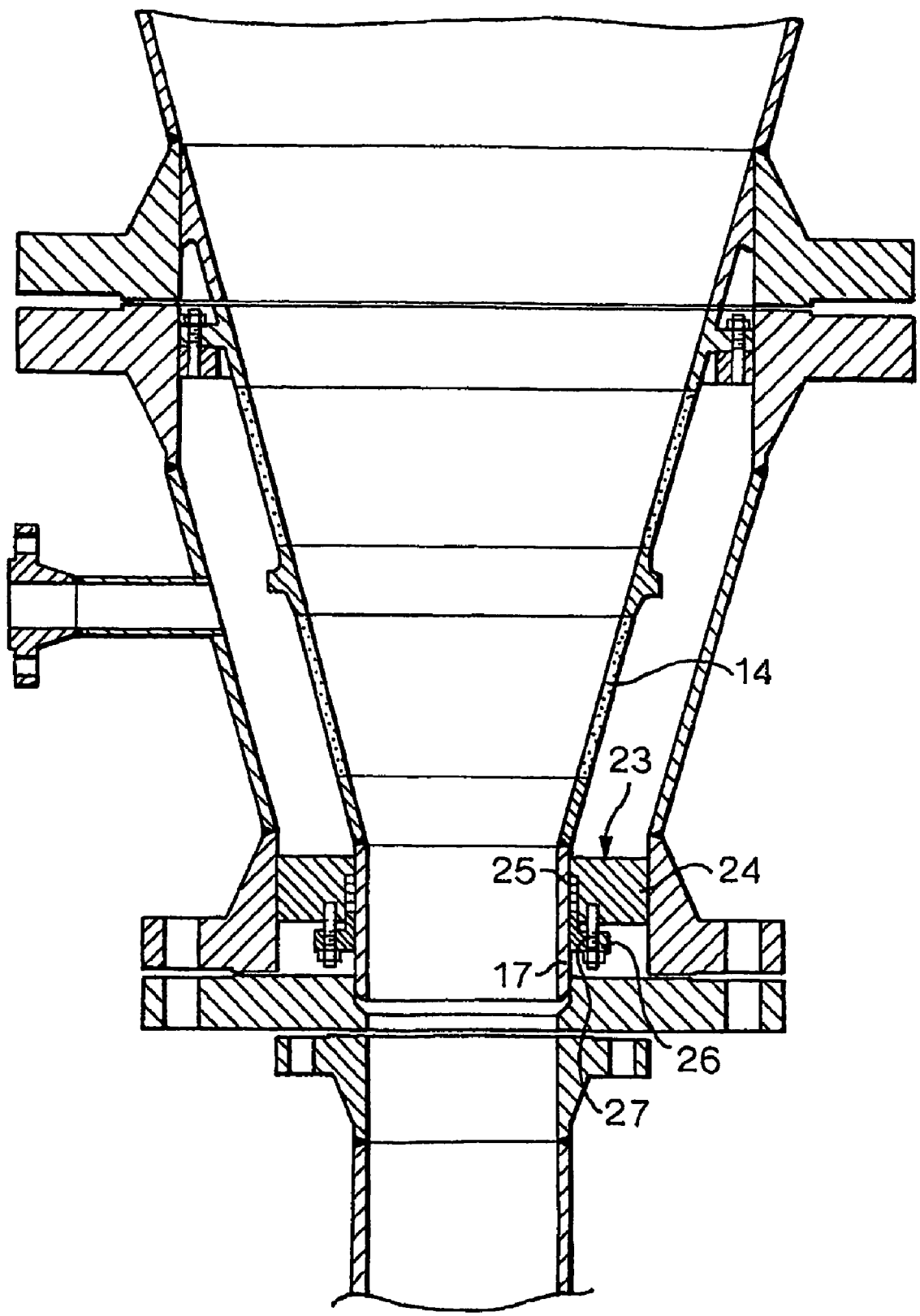

The invention will now be described in more detail and by way of example with reference to the drawings, which depict preferred embodiments of the vessel and discharge device according to the present invention. In the drawings, FIG. 1 shows a vessel according to the present invention;

FIG. 2 shows a first preferred embodiment of a discharge device suitable for use in the vessel of FIG. 1; and FIG. 3 shows a second preferred embodiment of a discharge device suitable for use in the vessel of FIG. 1.

It is noted that the drawings are not necessarily to scale and details, which are not necessary for an understanding of the present invention, may have been omitted. As a matter of course, the invention is not limited to the particular embodiments illustrated herein. Further, the drawings do not depict auxiliary equipment, such as pumps, compressors, cleaning devices etc.

FIGS. 1 and 2 show a vessel 1 for temporarily storing pulverised coal, which vessel 1 comprises a main part, in this case a so-called feed hopper 2, and, at its bottom side, a discharge device 3. The feed hopper 2 comprises, from top to bottom, an inlet 4 provided with a flange 5 for connecting the feed hopper 2 to a feed line (not shown), a dome-shaped top section 6, a circle-cylindrical middle section 7 and a frustoconical lower section 8, which is provided with a first flange 9. In this particular preferred embodiment, all these components 4-9 are rotationally symmetrical about a central axis A. However, other constructions, e.g. comprising two discharge devices, are also possible.

The discharge device 3 comprises an outer shell 10 provided with a second flange 11, which is connected to the first flange 9 by means of bolts. The outer shell 10 further comprises, at its bottom side, a third flange 12 for connecting the discharge device 3 to a feed line (not shown) of e.g. a gasifier. A metal ring 13 has been welded to the inner wall of the second flange 11, which ring 13 is provided with e.g. threaded holes or threaded ends distributed evenly over the ring 13 so as to provide a mounting means for an inner shell 14.

The inner shell 14 comprises a flanged upper rim 15, which is provided with bolts or nuts secured to, respectively, the threaded holes or threaded ends in the ring 13. A gasket 13' is positioned between the ring 13 and the upper rim 15 so as to render the connection leak tight. The upper rim 15 of the inner shell 14 extends substantially flush with the face of the second flange 11 so as to facilitate (horizontal) removal of the discharge device 3, e.g. for maintenance. The inner shell 14 further comprises a conical section 16 and a lower circle-cylindrical section 17. The wall of the conical section 16 is, for the greater part, made of a porous material, such as sintered stainless steel, sintered ceramic, or woven stainless steel, depending upon operating conditions and type of coal used, and reinforced by means of a metal ring 18. At its lower end, the conical section 16 comprises a solid metal ring 19 with which this section 16 is welded to the circle-cylindrical section 17 of the inner shell 14. The outer shell 10 further comprises an inlet 10' for feeding pressurised gas into the cavity 20 defined by the outer shell 10 and the inner shell 14. This inlet 10' runs substantially perpendicular to the central axis of the vessel, i.e. horizontally so as to facilitate connection of the discharge device 3 to a feed line. The type of gas, as well as its temperature, pressure and flow rate depend on the operating conditions. In general the aeration serves to overcome the frictional forces between the inner shell 14 and the solids contained therein and of inter-particle friction. For more detailed information on this subject reference may be had to U.S. Pat. No. 4,941,779 and U.S. Pat. No. 5,129,766 mentioned above.

The inner diameter of the circle-cylindrical section 17 corresponds to that of the third flange 12. A metal ring 21 surrounds the said circle-cylindrical section 17 and is welded to the conical inner wall of the outer shell 10. The ring 21 provides a smooth sealing surface for O-rings installed in grooves in the outer wall of the circle-cylindrical section 17. Further, this outer wall is, near its lower rim, also conical thus allowing (cycled) thermal expansion of the inner shell 14 without obstruction and without the building up of debris in the crevices between the said components.

The inner wall of the feed hopper 2 is matched to that of the inner shell 14 by means of an annular element 22 welded to the inner wall of the first flange 9. The conicity of the inner wall of this element 22 matches that of the other walls, thus further facilitating a uniform mass flow rate and avoiding bridging of coal or ash.

FIG. 3 shows a further preferred embodiment of the discharge device 3 according to the present invention, which is especially suitable for operating at higher temperatures e.g. in excess of 200° C. The circle-cylindrical section 17 of the inner shell 14 of this preferred embodiment is provided with a so-called stuffed box assembly 23, which is known in itself. The gasket 23 comprises an annular metal ring 24, which is welded to the inner wall of the third flange 12 and comprises and annular recess containing a seal 25, e.g. a suitable braided fibre seal material, such as a cord or cord-like structure of graphite of ceramic fibres. The seal 25 can be compressed by means of a further ring 26, which comprises an upwardly extending annular protrusion received in the said recess and which can be tightened by means of threaded ends 27.

In view of the above description, it will be clear the first and second flanges are dedicated to the connection of the pressure vessel walls, thus improving leak tightness, and that the inner shell is kept in place by means of a dedicated means, thus facilitating the positioning of the inner shell in the outer shell. Further, all flanges 9, 11, and 12 described above are standard (ANSI) flanges, no individually designed flanges are required.

The invention is not restricted to the above described embodiments which can be varied in a number of ways within the scope of the claims.

The invention claimed is:

1. A discharge device for use in a vessel for storing particulate matter, comprising a converging outer shell and a permeable, converging inner shell positioned in the outer shell, the inner shell comprising an upper rim, wherein the inner shell is secured at or near its upper rim to an inner wall of the outer shell forming a connection between the inner shell and the outer shell, wherein the connection between the inner shell and the outer shell is sealed by means of a gasket and is contained within the outer shell.

2. The discharge device of claim 1, wherein the inner shell has been attached to the inner wall of the outer shell.

3. The discharge device of claim 2, comprising a flange forming the upper rim of the outer shell, the inner shell being attached to an inner wall of this flange.

4. The discharge device of claim 3, wherein the upper rim of the inner shell extends at least substantially flush with the upper rim of the said flange.

5. The discharge device of claim 1 for use in a vessel for storing particulate matter, wherein the particulate matter comprises at least one of pulverized coal and fly ash.

6. A vessel for storing particulate matter, comprising a main part and, at a bottom portion thereof, at least one discharge device, which comprises a converging outer shell and a permeable, converging inner shell positioned in the outer shell, the inner shell comprising an upper rim, the discharge device being connected to the main part by means of a first flange at or near a lower rim of the bottom portion of the main part and a second flange at or near an upper rim of the outer shell, whereby the inner shell is secured at or near its upper rim to the inner wall of the outer shell of the discharge device thus forming a connection between the inner shell and the outer shell, wherein the connection between the inner shell and the outer shell is sealed by means of a gasket and is contained within the outer shell.

7. The vessel of claim 6, wherein the inner shell has been attached to an inner wall of the second flange.

8. The vessel of claim 7, wherein the inner shell is secured at or near its upper rim to the inner wall of the outer shell by means of at least one lug or ring provided on the inner wall of the second flange, to which lug or ring the inner shell is attached, whereby the gasket is positioned between the lug or ring and the inner shell.

9. The vessel of claim 6, wherein an element for matching an inner wall of the main part of the vessel to an inner wall of the inner shell has been attached to an inner wall of the first flange.

10. The vessel of claim 6, wherein the upper rim of the inner shell extends at least substantially flush with the face of the second flange.

* * * * *